United States Patent
Sharma

(10) Patent No.: US 9,154,278 B2
(45) Date of Patent: Oct. 6, 2015

(54) MOBILE COMMUNICATIONS DEVICE AND SYSTEM

(75) Inventor: Vivek Sharma, London (GB)

(73) Assignee: NEC CORPORATION, Tokyo (JP)

( * ) Notice: Subject to any disclaimer, the term of this patent is extended or adjusted under 35 U.S.C. 154(b) by 77 days.

(21) Appl. No.: 14/009,727

(22) PCT Filed: Mar. 16, 2012

(86) PCT No.: PCT/JP2012/057664
§ 371 (c)(1),
(2), (4) Date: Oct. 3, 2013

(87) PCT Pub. No.: WO2012/137615
PCT Pub. Date: Oct. 11, 2012

(65) Prior Publication Data
US 2014/0016498 A1    Jan. 16, 2014

(30) Foreign Application Priority Data
Apr. 4, 2011   (GB) .................................. 1105693.4

(51) Int. Cl.
*H04L 5/00*       (2006.01)
*H04W 16/14*   (2009.01)
*H04W 88/06*   (2009.01)

(52) U.S. Cl.
CPC ............. *H04L 5/0032* (2013.01); *H04W 16/14* (2013.01); *H04W 88/06* (2013.01)

(58) Field of Classification Search
CPC ..... H04W 16/14; H04W 88/06; H04L 5/0032
See application file for complete search history.

(56) References Cited

U.S. PATENT DOCUMENTS

| 7,610,057 B2 | 10/2009 | Bahl et al. |
| 2005/0239497 A1 | 10/2005 | Bahl et al. |

(Continued)

FOREIGN PATENT DOCUMENTS

| EP | 2315492 A1 | 4/2011 |
| JP | 2005-328520 A | 11/2005 |

(Continued)

OTHER PUBLICATIONS

International Search Report in PCT/JP2012/057664 dated Jun. 27, 2012 (English Translation Thereof).

(Continued)

*Primary Examiner* — Mark Rinehart
*Assistant Examiner* — Gbemileke Onamuti
(74) *Attorney, Agent, or Firm* — McGinn IP Law Group, PLLC

(57) ABSTRACT

A mobile communications device having an LTE radio technology and at least one other technology (for example, Bluetooth or Wi-Fi) determines whether transmissions using the other radio technology causes, or is likely to cause interference in reception of LTE signals. If such interference exists or is likely, then a signal indicating interference is sent to the LTE base station, which can take action to try to mitigate or prevent such interference. The mobile communications device can have a timer so that the interference indicating signal is only sent periodically, either at regular intervals, or whenever the interference is determined to exist after the timer period has expired. In some cases, a signal indicating that the interference level has reduced can be sent, again either at regular intervals, to whenever the interference level changes.

11 Claims, 5 Drawing Sheets

(56) References Cited

U.S. PATENT DOCUMENTS

| | | | |
|---|---|---|---|
| 2010/0035562 A1* | 2/2010 | Alberth et al. | 455/75 |
| 2010/0067469 A1* | 3/2010 | Gaal et al. | 370/329 |
| 2012/0207040 A1 | 8/2012 | Comsa et al. | |
| 2012/0252442 A1 | 10/2012 | Fu et al. | |
| 2012/0281563 A1* | 11/2012 | Comsa et al. | 370/252 |

FOREIGN PATENT DOCUMENTS

| | | |
|---|---|---|
| JP | 2010-073325 A | 4/2010 |
| JP | 2013-535938 A | 9/2013 |
| JP | 2014-508487 A | 4/2014 |
| WO | WO 2010/002219 A2 | 1/2010 |
| WO | WO 2010/017057 A1 | 2/2010 |
| WO | WO 2010/030938 A1 | 3/2010 |
| WO | WO 2010/120605 A2 | 10/2010 |

OTHER PUBLICATIONS

Technical Report 3GPP TR 38.816 V 1.2.0 entitled 3GPP: "3rd Generation Partnership Project; Technical Specification Group Radio Access Networks; Evolved Universal Terrestrial Radio Access (E-UTRA); Study on signalling and procedure for interference avoidance for in-device coexistence; (Release 10)", 3GPP Draft; R2-111759, 3rd Generation Partnership Project (3GPP), Mobile Competence Centre ; 650, Route Des Lucioles ; F-06921 Sophia-Antipolis Cedex, France, vol. RAN WG2, no, Taipei, Taiwan; Feb. 21, 2011, Mar. 7, 2011, XP050494127, [retrieved on Mar. 7, 2011] * chapter 3.1, 4, 4,1, 5, 5.1, 5.2*.

PANTECH: "Restrictions on reactive/proactive indications in FDMICO", 3GPP Draft; R2-111300 Restrictions on Reactive and Proactive Indications in FDMICO, 3rd Generation Partnership Project (3GPP), Mobile Competence Centre; 650, Route Des Lucioles ; F-06921 Sophia-Antipolis CEDEX ; France, vol. Ran WG2, no. Taipei, Taiwan; Feb. 21, 2011, Feb. 15, 2011, XP050493774, [retrieved on Feb. 15, 2011] * chapters 3, 2 *.

Nokia Corporation et al: "Use scenarios and TDM considerations for GNSS coexistence", 3GPP Draft; R2-110848 Use Scenarios and TDM Considerations for GNSS Coexistence, 3rd Generation Partnership Project (3GPP), Mobile Competence Centre; 650, Route Des Lucioles ; F-06921 Sophia-Antipolis CEDEX; France, vol. RAN WG2, no. Taipei, Taiwan; Feb. 21, 2011, Feb. 15, 2011, XP050493633, [retrieved on Feb. 15, 2011] * chapter 2, last two paragraphs ** chapter 5, first two and last paragraph.

LG Electronics Inc: "Necessity of on/off indication for avoiding in-device coexistence interference", 3GPP Draft; R2-106563 Necessity of On Off Indication for Avoiding In-Device Coexistence Interference V2, $3^{rd}$ Generation Partnership Project (3GPP), Mobile Competence Centre; 650, Route Des Lucioles ; F-06921 Sophia-Antipolis CEDEX; France, vol. RAN WG2, no. Jacksonville, USA; Nov. 15, 2010,Nov. 9, 2010, XP050492341.[retrieved on Nov. 9, 2010] chapter 2*.

LG Electronics Inc: "Cell reselection procedure enhancement for avoiding in-device coexistence interference". 3GPP Draft; R2-110444 Cell Reselection Procedure Enhancement for Avoiding In-Device Coexistence Interference V3. $3^{rd}$ Generation Partnership Project (3GPP). Mobile Competence Centre; 650. Route Des Lucioles ; F-06921 Sophia-Antipolis CEDEX; France. vol. RAN WG2. no. Dublin, Ireland; Jan. 17, 2011. Jan. 11, 2011. XP050493052. [retrieved on Jan. 11, 2011] * chapters 1, 2. 3 *.

LG Electronics Inc: "Possible Solutions for In-device Interference Avoidance". 3GPP Draft; R2-104880 Possible Solutions for In-Device Interference Avoidance, $3^{rd}$ Generation Partnership Project (3GPP). Mobile Competence Centre; 650. Route Des Lucioles ; F-06921 Sophia-Antipolis Cedex; France. vol. RAN WG2, no. Madrid, Spain; Aug. 23, 2010. Aug. 17, 2010. XP050452006. [retrieved on Aug. 17, 2010] * chapter 2 *.

Samsung: "Need for optimisation of reselection procedure for in-device coexistence ", 3GPP Draft; R2-110412. 3rd Generation Partnership Project (3GPP), Mobile Competence Centre ; 650 Route Des Lucioles; F-06921 Sophia-Antipolis Cedex; France. vol. RAN WG2. no. Dublin. Ire land; Jan. 17, 2010. Jan. 10, 2011. XP050492806. [retrieved on Jan. 10, 2011] * chapter Discussion *.

Motorola: Further Considerations on In-device Coexistence Interference Avoidance 3GPP Draft; R2-104809-In-Device Coexistence Avoidance, 3rd Generation Partnership Project (3GPP), Mobile Competence Centre; 658, Route Des Lucioles; F-86921 Sophia-Antipolis Cedex , France, vol. RAN WG2, no. Madrid, Spain; 28188823, Aug. 17, 2818, XP858451952, [retrieved on 2818-88-17] * chapters 1, 2 *.

Research in Motion UK Limited: "Enhancement of FDM solution and HO", 3GPP Draft; R2-111234, 3rd Generation Partnership Project (3GPP), Mobile Competence Centre ; 658, Route Des Lucioles; F-86921 Sophia-Antipolis Cedex, France, vol. RAN WG2, no. Taipei, Taiwan; 28118221, Feb. 15, 2811, XP858493736, [retrieved on 2811-82-15] * chapter 2 *.

Sudhi R Kumar Baghel et al: "Coexistence possibilities of LTE with ISM technologies and GNSS", 2811 National Conference on Communications (NCC), Jan. 1, 2811, pp. 1-5, XP55881826, DOI: 18.1189/NCC.2811.5734742 ISBN: 978-1-61-284898-1 * chapters I, IV, V*.

Technical Report 3GPP TR 36.816 v1.0.0 entitled "$3^{rd}$ Generation Partnership Project; Technical Specification Group Radio Access Networks; Evolved Universal Terrestrial Radio Access (E-UTRA); Study on signalling and procedure for interference avoidance for in-device coexistence; (Release 10)" available at http://www.3gpp.org/ftp/specs/archive/36_series/36.816/36816-100.zip.

Japanese Office Action dated Oct. 8, 2014 with a partial English translation.

CMCC, Huawei, "Discussion on Indication of Coexistence Interference", 3GPP R2-111251, 3GPP TSG-RAN WG2 Meeting #73, Feb. 21-25, 2011, Taipei, Taiwan.

LG Electronics Inc., "Possible Enhancement for Idle Mode UE to Avoid In-Device Coexistence Interference", 3GPP R2-106564, 3GPP TSG-RAN2 Meeting #72, Nov. 15-19, 2010, Jacksonville, U.S.A.

* cited by examiner

MOBILE COMMUNICATIONS DEVICE AND SYSTEM

TECHNICAL FIELD

The present invention relates to mobile communications devices and networks, particularly but not exclusively those operating according to the 3GPP standards or equivalents or derivatives thereof. The invention has particular although not exclusive relevance to the Long Term Evolution (LTE) of UTRAN (called Evolved Universal Terrestrial Radio Access Network (E-UTRAN)) and to its interaction with other radio technologies, such as Bluetooth, Wi-Fi, Global Positioning System (GPS) and others.

BACKGROUND ART

Mobile communications devices or User Equipment (UE) often contain a number of different radio technologies that enable the UE to connect or communicate with various other devices or base stations using different formats, which may or may not use other frequencies. Thus, for example, a UE may include Bluetooth connectivity, Wi-Fi connectivity, GPS connectivity, as well as LTE connectivity. Often, some or all of these radio technologies will be operative at the same time, so that the UE is connected to several of these systems at once (sometimes known as in-device coexistence). Depending on the frequencies, it will be appreciated that UE transmissions on one radio technology may cause interference to the receivers of the others. This problem may be particularly acute in certain LTE frequency bands, some of which lie adjacent the Industrial, Scientific and Medical (ISM) frequency band, where the Wi-Fi and Bluetooth channels are located.

This problem of in-device coexistence interference, has been considered in, for example Technical Report 3GPP TR 36.816 v1.0.0 entitled "$3^{rd}$ Generation Partnership Project; Technical Specification Group Radio Access Networks; Evolved Universal Terrestrial Radio Access (E-UTRA); Study on signalling and procedure for interference avoidance for in-device coexistence; (Release 10)" available at http://www.3gpp.org/ftp/specs/archive/36 series/36.816/36816-100.zip. The objective of this report is to investigate suitable mechanisms for interference avoidance from the signalling and procedural point of view to facilitate the coexistence scenario that LTE and GPS/ISM radio within the same device working in adjacent frequencies or sub-harmonic frequencies. The work under this study evaluates whether existing Radio Resource Management (RRM) mechanisms could be utilized to effectively solve the coexistence problems that arise with such scenarios and provide the required Quality of Service (QoS) in LTE with proper GPS/ISM operation, and also, if legacy signaling and procedure are not sufficient to ensure required performance in the particular coexistence scenario, whether enhanced mechanisms would better avoid interference and mitigate the impact caused by ISM radio.

In the report, three modes of operation in which in-device coexistence interference may occur were considered. In the first, uncoordinated, mode, different technologies in the UE operate independently, without any internal coordination between each other. In the second mode, different radio technologies within a UE are coordinated to the extent that one radio technology is aware of what another one is doing so that, if there is co-existence interference, the UE may be able to adjust operation to remove or at least minimise the effects of such interference. The third mode is where there is coordination not just within the UE, but also between the UE and the network, which allows the network to take action to try to minimise any coexistence interference that the UE has informed it about. Some solutions that are discussed in the report are UE controlled and include moving the LTE signal away from the ISM band or moving the ISM signal away from the LTE band. In another solution, the UE tries to Time Division Multiplex (TDM) the signals so that interference is avoided. Other solutions are LTE-network controlled with the assistance of the UE. In the latter solutions, the UE informs the network base station of interference problems and the base station may then apply mitigation techniques to try to reduce or avoid the interference. The mitigation may be either Frequency Division Multiplexing (FDM) or TDM to change the signal frequencies or times, or may increase power on the downlink to try to reduce or avoid the interference. The UE therefore sends a signal to the network that there is an interference problem, for example when there is on-going interference on the serving frequency. This may be considered as a reactive indication. However, the problem with the LTE-network controlled UE assisted solutions is that they rely on the indication signal from the UE. More particularly, the solutions require that the indication signal be triggered within the UE based on a measurement of the interference, and such measurement can be unreliable, and can cause unnecessary indication signals to be sent to the network too frequently, thereby unnecessarily burdening the network.

DISCLOSURE OF THE INVENTION

Embodiments of the present invention aim to provide techniques for providing appropriate and proportional indications to the network to allow the network to take interference mitigating measures.

According to one aspect, the present invention provides a mobile communications device comprising a transmitter of a first radio technology on a first frequency band; a transceiver of a second radio technology on a second frequency band; interference determining means for determining whether transmission from the transmitter is or potentially may interfere with reception by the transceiver; the transceiver being configured for transmitting an interference indication signal for a network base station of the second radio technology that there is or may be interference with reception in the second frequency band in the mobile communications device; a timer which times a predetermined period and is set whenever the interference indicating signal is transmitted by the transceiver; wherein no further interference indication signals are transmitted from the mobile communications device until the predetermined period has expired.

In one embodiment, the interference determining means determines whether there is or is not interference based on whether a measured interference level is above or below a predetermined threshold.

The interference determining means may determine whether there is or is not interference based on whether proposed transmission by the transmitter is likely to interfere with reception by the transceiver.

In an embodiment, the interference indication signal is again transmitted at the end of the predetermined period if the interference determining means determines that there is or may be interference between transmission from the transmitter and reception by the transceiver.

The interference indication signal may be transmitted at regular intervals, determined by the predetermined period as long as the interference determining means determines that there is or may be interference between transmission from the transmitter and reception by the transceiver.

A lack of interference indication signal may be transmitted at the end of the predetermined period if the interference determining means determines that there is or may be no interference between transmission from the transmitter and reception on the receiver, wherein the timer is set whenever the lack of interference signal is transmitted by the transceiver.

In one embodiment, the lack of interference indication signal is again transmitted at the end of the predetermined period if the interference determining means determines that there is or may be no interference between transmission from the transmitter and reception on the receiver.

The lack of interference indication signal may be transmitted at regular intervals, determined by the predetermined period as long as the interference determining means determines that there is or may be no interference between transmission from the transmitter and reception by the transceiver.

In an embodiment, the interference indication signal is transmitted only once and a lack of interference indication signal is transmitted if the interference determining means determines that there is or may be no interference between transmission from the transmitter and reception on the receiver, provided the predetermined period has expired, wherein the timer is set whenever the lack of interference signal is transmitted by the transceiver.

The lack of interference indication signal may be transmitted only once.

In a second aspect, there is provided a mobile communications device comprising a transmitter of a first radio technology on a first frequency band; a transceiver of a second radio technology on a second frequency band; interference determining means for determining whether transmission from the transmitter is or may interfere with reception by the transceiver; and means for excluding a cell and/or frequency from a plurality of cells and/or frequencies of the second radio technology for the mobile communications device to communicate depending on whether the interference determining means determines that transmission from the transmitter is or may interfere with reception by the transceiver of communications from the cell and/or frequency.

In one embodiment, the interference determining means determines whether there is or is not interference based on whether a measured interference level is above or below a predetermined threshold.

The interference determining means may determine whether there is or is not interference based on whether proposed transmission by the transmitter is likely to interfere with reception by the transceiver.

The means for excluding a cell and/or frequency excludes a cell and/or frequency from possible communication according to available frequencies for communication that the interference determining means determines would not interfere with the transmission from the transmitter.

In one embodiment, the means for excluding a cell and/or frequency excludes a cell and/or frequency from the plurality of possible cells and/or frequencies if an interference indication signal has previously been transmitted by the transceiver based upon the interference determining means determining that transmission from the transmitter is or may interfere with reception by the transceiver of signals from that cell and/or frequency.

The mobile communications device may further comprise a timer for timing a predetermined time and is set whenever the interference indicating signal is transmitted by the transceiver and wherein said means for excluding a cell and/or frequency excludes a cell and/or frequency from the plurality of possible cells and/or frequencies if the timer has not expired.

In one embodiment, the mobile communications device further comprises a selection/reselection module for carrying out selection/reselection of a cell and/or frequency from the plurality of possible cells and/or frequencies.

According to a further aspect, the invention provides a mobile communications device comprising a transmitter of a first radio technology on a first frequency band; a transceiver of a second radio technology on a second frequency band; interference determining means for determining whether transmission from the transmitter is or may interfere with reception by the transceiver; the transceiver being configured for transmitting an interference indication signal for a network base station of the second radio technology if the interference determining means determines that there is or may be interference with reception in the second frequency band in the mobile communications device and for transmitting a lack of interference indication signal if the interference determining means determines that there is or may be no interference between transmission from the transmitter and reception on the receiver.

In a still further aspect, the invention provides a communications system comprising a mobile communications device as described above; and a base station of the second radio technology in communication with the mobile communications device, wherein the base station comprises a receiver for receiving the interference indication signal transmitted by the mobile communication device and an interference mitigation means for changing one or more parameters of the communication with the mobile communications device in order to mitigate the interference.

In one embodiment, the base station includes a timer for timing a predetermined period, and wherein the interference mitigation means reverts the one or more parameters that were changed back to previous parameters when the timer expires.

The receiver may be configured for receiving a lack of interference indication signal transmitted by the mobile communication device, and wherein the interference mitigation means reverts the one or more parameters that were changed back to previous parameters when the receiver receives a lack of interference indication signal.

BRIEF DESCRIPTION OF THE DRAWINGS

These and other features and aspects of the invention will become apparent from the following detailed description of exemplary embodiments, that are described with reference to the accompanying drawings in which.

BEST MODE FOR CARRYING OUT THE INVENTION

Overview

Figure 1:
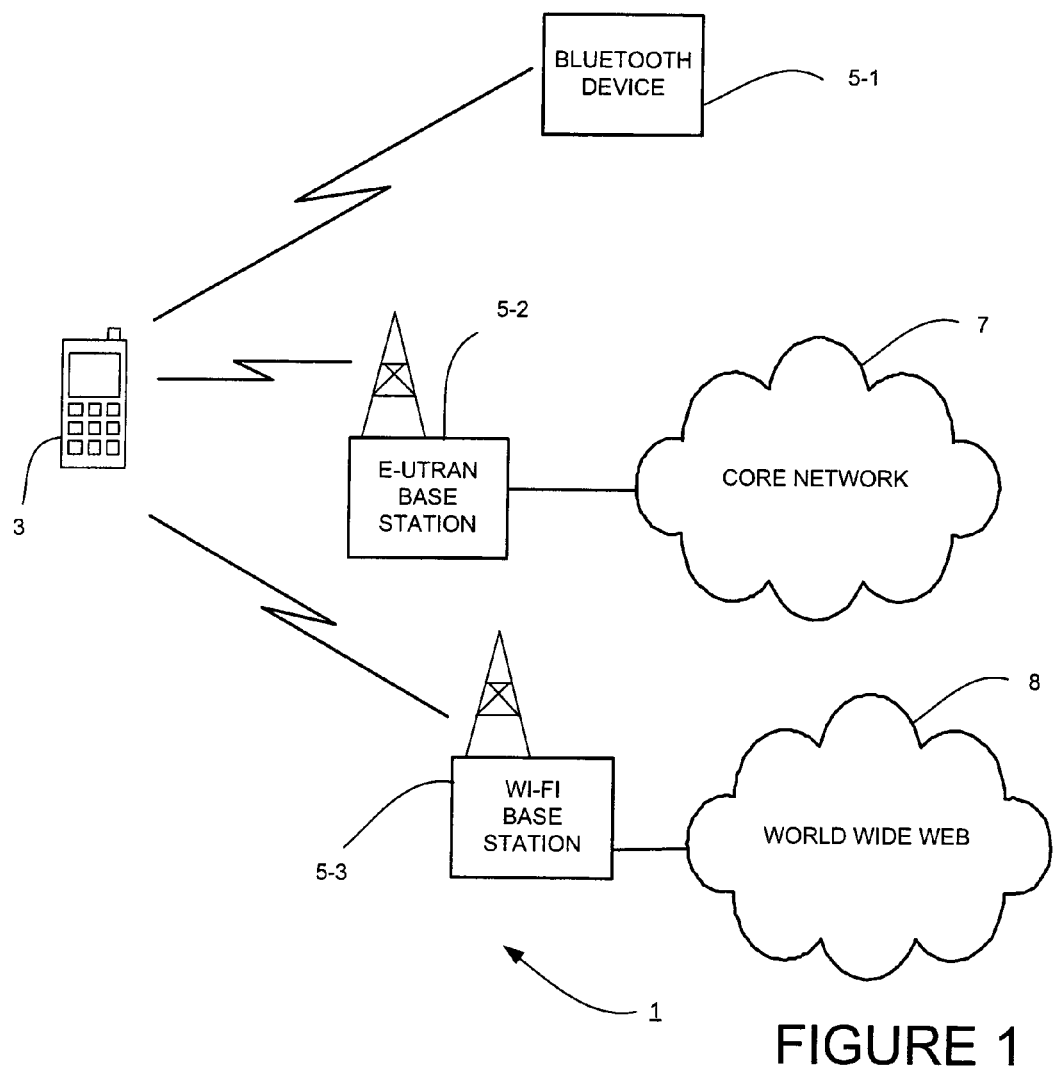
FIG. 1 schematically illustrates a mobile telecommunication system of a type to which the embodiment is applicable.

FIG. 1 schematically illustrates a mobile (cellular) telecommunication system 1 in which users of a mobile communication device, such as a mobile telephone 3, can communicate with other users (not shown) via another device 5-1, or one of the base stations 5-2 or 5-3. In the system illustrated in FIG. 1, the device 5-1 is a Bluetooth device for communicating with the mobile device 3 using Bluetooth radio technology; base station 5-2 is an E-UTRAN base station for communicating with the mobile device 3 using LTE radio technology and which allows the mobile device 3 to connect through to a core network 7; and base station 5-3 is a Wi-Fi base station through which the mobile device can connect to the World Wide Web (Internet). At least the E-UTRAN base station 5-2 operates a number of base station cells, each having a number of uplink and downlink communications resources (sub-carriers, time slots etc) that are available for wireless communication between the mobile telephone 3 and the E-UTRAN base station 5-2. The E-UTRAN base station 5-2 allocates downlink resources to the mobile telephone 3 depending on the amount of data to be sent to the mobile telephone 3. Similarly, E-UTRAN base station 5-2 allocates uplink resources to the mobile telephone 3 depending on the amount and type of data the mobile telephone 3 has to send to the E-UTRAN base station 5-2.

The E-UTRAN base station 5-2 transmits handover parameters and cell selection and reselection parameters and rules to be used by the mobile telephone 3 in making signal measurements of neighbouring cells and in the case of cell selection and/or reselection for selecting/reselecting an available base station cell with which to register. If the handover and/or cell selection/reselection parameters are changed by the E-UTRAN base station 5-2, then a mobile telephone 3 being served by the E-UTRAN base station 5-2 may select/reselect or handover to a base station in another cell.

E-UTRAN Base Station

Figure 2:
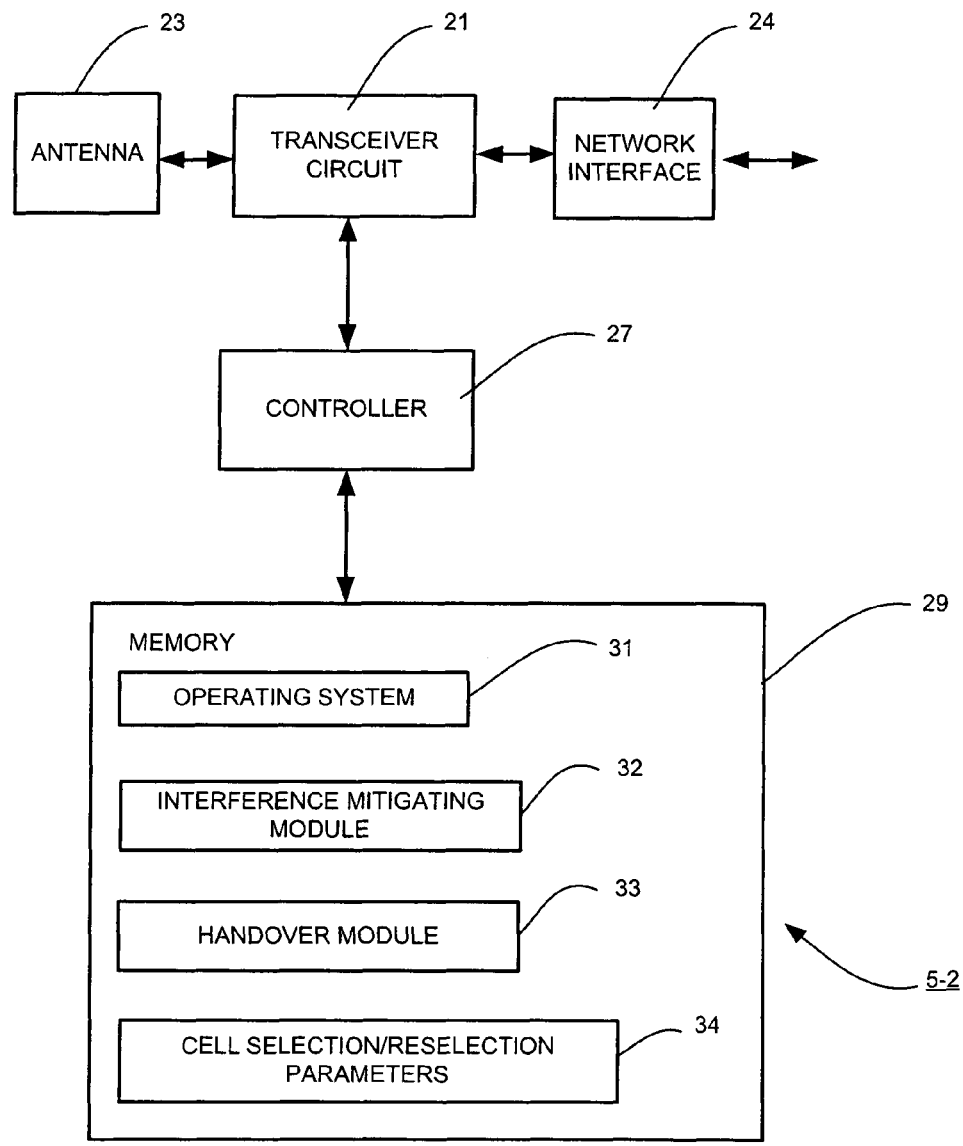
FIG. 2 schematically illustrates an E-UTRAN base station forming part of the system shown in FIG. 1.

FIG. 2 is a block diagram illustrating the main components of the E-UTRAN base station 5-2 used in this embodiment. As shown, the E-UTRAN base station 5-2 includes a transceiver circuit 21 which is operable to transmit signals to and to receive signals from the mobile telephones 3 via one or more antennae 23 and to transmit signals to and receive signals from the telephone core network 7 via the interface 24. A controller 27 controls the operation of the transceiver circuit 21 in accordance with software and data stored in memory 29. The software and data includes, among other things, an operating system 31, a handover module 33 and handover and cell selection/reselection parameters 34. The handover module 33 is responsible for controlling handover of mobile telephones 3 to or from the E-UTRAN base station 5-2 based on the handover and cell selection/reselection parameters 34. An interference mitigating module 32 is also provided for taking appropriate action to try to mitigate interference that may be present in the UE, as will be further described below.

In the above description, the base station 5-2 is described for ease of understanding as having a number of discrete modules (such as the load balancing modules and the handover modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Mobile Telephone

Figure 3:
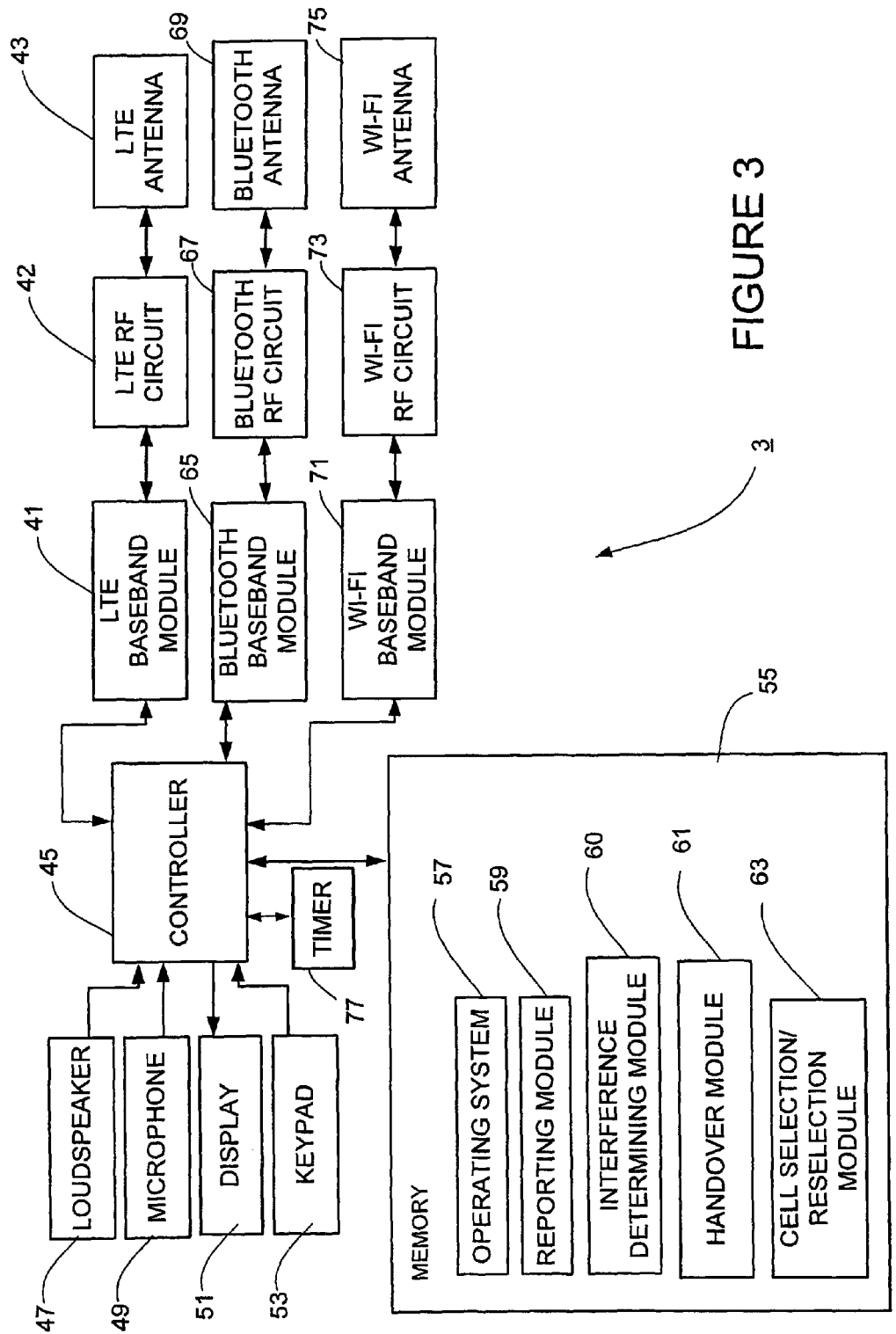
FIG. 3 schematically illustrates a mobile telephone forming part of the system shown in FIG. 1.

FIG. 3 schematically illustrates the main components of the mobile telephone 3 shown in FIG. 1. As shown, the mobile telephone 3 includes an LTE baseband module 41 which is coupled to an LTE RF circuit 42 operable to transmit signals to and to receive signals from the E-UTRAN base station 5-2 via one or more LTE antennae 43. As shown, the mobile telephone 3 also includes a controller 45 which controls the operation of the mobile telephone 3 and which is connected to the LTE baseband module 41 and to a loudspeaker 47, a microphone 49, a display 51, and a keypad 53. The controller 45 operates in accordance with software instructions stored within memory 55. As shown, these software instructions include, among other things, an operating system 57, a reporting module 59, an interference determining module 60, a handover module 61 and a cell selection/reselection module 63. The controller 45 is also coupled to a Bluetooth baseband module 65 which is coupled to a Bluetooth RF circuit 67 operable to transmit signals to and to receive signals from the Bluetooth device 5-1 via one or more Bluetooth antennae 69, as well as to a Wi-Fi baseband module 71 which is coupled to a Wi-Fi RF circuit 73 operable to transmit signals to and to receive signals from the Wi-Fi base station 5-3 via one or more Wi-Fi antennae 75.

In one embodiment, the interference determining module 60 is operable to make measurements on signals received from received from the LTE base station 5-2 with which the mobile telephone 3 is currently registered via the LTE antenna 43 and LTE RF circuit 42 to the LTE baseband module 41 to determine whether there is on-going interference from signals transmitted from either the Bluetooth baseband module 65 via the Bluetooth RF circuit 67 and the Bluetooth antenna 69 or the Wi-Fi baseband module 71 via the Wi-Fi RF circuit 73 and the Wi-Fi antenna 75. The reporting module 59 is operable to report the occurrence of specified events back to the serving base station 5. The handover module 61 is operable to control the handover of the mobile telephone 3 from one cell to another and the cell selection/reselection module 63 is operable to control cell selection/reselection.

Determination of Interference

As mentioned above, the interference determining module 60 is operable to make measurements on signals received from the LTE base station 5-2 with which the mobile telephone 3 is currently registered via the LTE antenna 43 and LTE RF circuit 42 to the LTE baseband module 41 to determine whether there is on-going interference from signals transmitted via the other antennae 69, 75. Interference can be measured in different ways, for example by measuring the Signal to Noise Ratio (SNR) in any known manner, measuring good to bad bit ratios, or in any other way. The measure of interference present can be compared to threshold values to see whether it is sufficient to warrant a signal to be sent to the LTE base station 5-2 to indicate that such interference is present. It will be appreciated that if the level of interference is small, then such an indication signal need not be sent.

Alternatively or additionally, the mobile communications device 3 can send an indication signal to the network proactively when it considers that there is a potential for interference on the serving frequency, even though it is not on-going, where there is an on-going interference, but not on the serving frequency, or where there is potential for interference, even though it is not on-going, on non-serving frequencies. In these cases, the interference determining module 60 can determine from expected transmissions from one or other of the Bluetooth or Wi-Fi radio technologies that interference is likely when such transmission begins, either by an analysis of the frequencies concerned, compared to the LTE frequency being used for communication with the LTE base station, or from a knowledge of previous interference events and the frequencies that were in use at that time. If the interference determining module 60 determines that there is potential for interference, it can send the interference indicating signal via the LTE radio technology to the LTE base station. Thus, the LTE base station, upon receiving the interference indicating signal, knows that there is either ongoing or potential co-existence interference at the mobile communications device and the interference mitigating module 32 can then take whatever action it chooses to try to avoid or mitigate such interference, as appropriate.

Interference Indication Signal

The interference indication signal is sent when the interference determining module 60 determines that there is ongoing or potential interference between transmission from the Bluetooth or Wi-Fi transmitter and reception by the LTE receiver. Reception of this signal by the LTE base station causes the LTE base station to try to mitigate the interference. However, the LTE bases station has no way of determining whether its actions have been successful (or sufficiently successful) or when the mitigating action is no longer required.

Therefore, in one embodiment, the mobile communication device 3 is provided with a timer 77, which is set to time a predetermined period, for example, from around 100 ms up to a few seconds. The timer is used to regulate the interference indicating signal. For example, in one implementation, the timer is used to provide a regular time period and the interference indicating signal is sent by the mobile telephone to the LTE base station when the timer period ends if the interference determining device determines that interference is present or likely. Thus, at the point when the timer expires, if interference is determined to be on-going or potential, the interference indicating signal is sent. If the interference determining module 60 determines that interference is not present or likely, then a lack of interference indicating signal may be sent, either regularly whenever the timer period expires, or once only. Sending an indicating signal, whether an interference indicating signal or a lack of interference signal, sets the timer.

Figure 4:
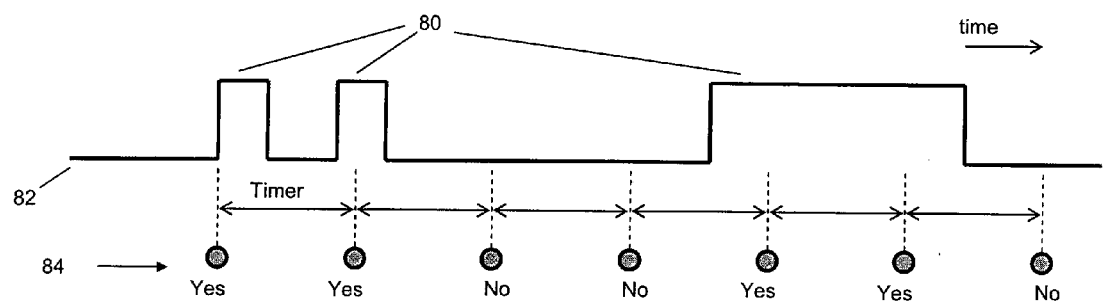
FIGS. 4 to 8 schematically illustrate interference indicating signalling in a mobile telephone forming part of the system shown in FIG. 1.

Of course, if the lack of interference indicating signal is sent regularly, then, effectively, whenever the timer period expires, either an interference indicating signal or a lack of interference indicating signal is sent. In this case, the timer can be reset as soon as it expires, without needing the trigger of an indicating signal being sent. This is shown in FIG. 4, where periods of high interference 80 are shown separated by periods of low interference 82. Thus one or other of the indicating signals 84 are sent at the end of each period. This provides constant positive information to the LTE base station whether there is interference or not, but increases the signal traffic and also means that, if for example, a change in the interference level occurs partway through a timer period, then the LTE base station will not be informed of that change in interference level until the end of that timer period.

Figure 5:
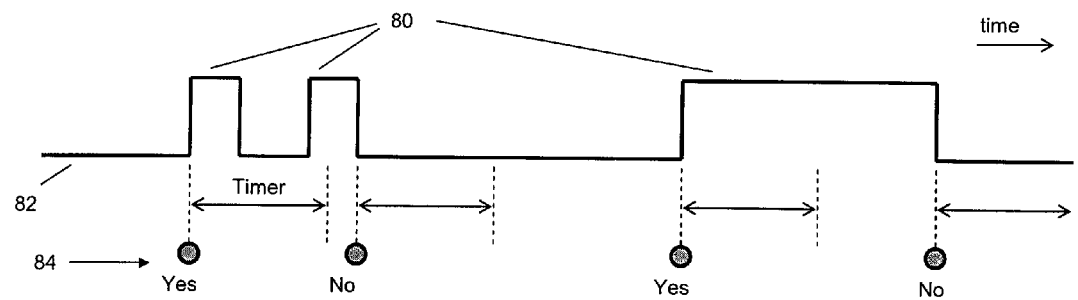

Therefore, in another implementation, as shown in FIG. 5, no indication signals 84 are sent unless the interference level has changed and the timer period has expired. Thus, an interference indicating signal is only sent once and then, once the timer period has expired, no further indicating signal is sent until the interference level is determined to be low and the lack of interference indicating signal is sent, again setting the timer. In this implementation, the number of indicating messages is limited, but there is immediate reaction to a change in the interference level.

Figure 6:
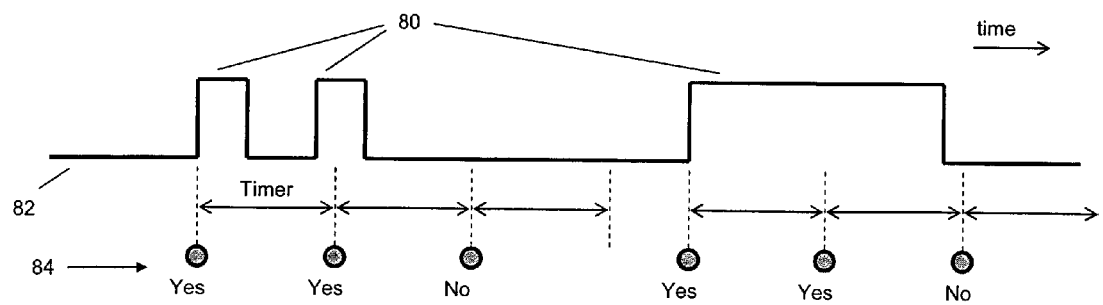

Another option, as shown in FIG. 6, is to send the interference indicating signals 84 whenever the timer period expires and the interference determining module determines that there is (or is likely to be) interference, but only to send the lack of interference indicating signal once. Thereafter, and after the timer period expires, the interference indicating signal will be sent, and the timer set.

Figure 7:
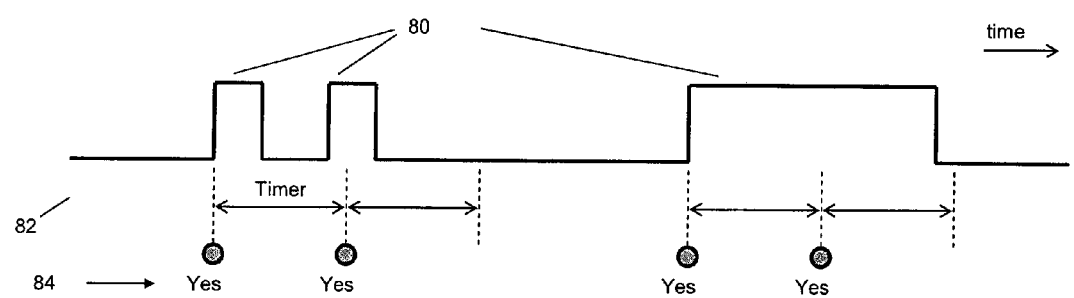

A still further option, as shown in FIG. 7, is not to send any lack of interference signals at all. In this case, the interference indicating signals are sent each time the timer period expires, provided that the interference determining module determines that there is (or is likely to be) interference. If the interference determining module determines that there is no (or there is unlikely to be) interference, then no signal is sent. If the LTE base station operates its own timer that is set when the interference indicating signals are received, then expiry of that timer with no interference indicating signal having been received, will indicate to the LTE base station that the interference level has reduced to below the threshold that the mobile telephone considers sufficient.

It should be noted that the timer period can be configured semi-statically by signalling between the mobile telephone and the LTE base station. The duration of the period could be selected by the mobile telephone and notified to the base station (this may be preferable because the mobile telephone has better knowledge of the likely interference duration), or the duration could be selected by the LTE base station and notified to the mobile telephone (this would allow the LTE base station to control the maximum rate at which indications can be produced by the mobile telephone) or the duration could be selected by the mobile telephone from a set of values or a range specified by the LTE base station (combines benefits of the above). The timer duration could be signalled using a fixed range and step size, e.g. 0 represents 100 ms, 1 represents 200 ms, etc., or as an index into a pre-defined set of possible values. The latter case would allow for more efficient signalling, since a set of, for example 8 values should be sufficient, which can be signalled with 3 bits. In the case that a pre-defined set of values is used, a further possibility is to re-use the set of values already used for the mobile telephone reporting interval, which may correspond to the measurement reporting intervals already specified by a base station.

Figure 8:
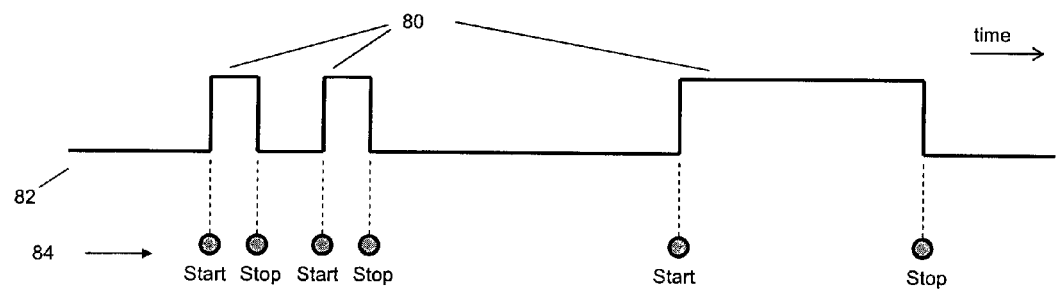

In FIG. 8 there is shown how a different embodiment, without the timer 77 may operate. In this case, every time the interference level changes, an indicating signal 84 is sent. Thus, as shown, when the interference level goes high 80, the interference indicating signal 84 is sent, and when the interference level goes low 82, the lack of interference indicating signal 84 is sent. Thus, the lack of interference signal is sent as soon as the interference determining module 60 determines that interference is not present or likely.

In a still further embodiment, the result of the interference determining module 60 may be used by the handover module 61 and/or the cell selection/reselection module 63 to allow the mobile telephone 3 to affect handover from one cell or frequency to another, or to select or reselect a cell, perhaps after loss of communication, based on the interference determination so as to try to avoid any interference. In general, a mobile communications device will select a suitable cell based on idle measurements and predetermined cell selection criteria. One of two cell different cell selection procedures is usually used. In a first cell selection process, no prior knowledge of which RF channels are E-UTRA carriers is required. The UE simply scans all the RF channels in the E-UTRA bands according to its capabilities and, on each carrier frequency, searches for the cell with the strongest signal. Once a suitable cell (i.e. a cell that the UE is allowed to connect through) is found, that cell is selected. The second cell selection process requires stored information of carrier frequencies and optionally also information on cell parameters, from previously receive measurement control information elements or from previously detected cells. Once the UE has found a suitable cell, it selects it. If no suitable cell is found, the Initial Cell Selection procedure that selects a cell when a UE first powers up, is implemented. It may be noted that the UE does not use priorities for different frequencies or different Radio Access Technologies (RATs) that may be provided to it by the system in the cell selection process.

However, in this further embodiment, the mobile telephone 3 may exclude from consideration for handover or (re)selection, any cell and/or frequency that has been determined to be susceptible to (high levels) of interference when using the second cell selection process mentioned above. In this case, the second cell selection process would include stored information of carrier frequencies and optionally also information on cell parameters, from previously receive measurement control information elements or from previously detected cells or from the interference indicating signal (reactive trigger) transmitted regarding the frequency of a particular cell (base station). In other words, the UE would not include frequencies in the handover or cell selection/reselection process for which it has sent the interference indicating signal (reactive trigger) due to in-device interference.

It should be noted that if a frequency is excluded from cell selection/reselection then that would imply that all cells on that frequency should not be considered for cell selection/reselection. If, on the other hand, only a cell is excluded from the possible cells for cell selection/reselection, then the UE would still allowed to select/reselect another cell on the same frequency. This would be of use in the case where the target cell signal has sufficient strength compared to the source cell, but happens to be on the same frequency that the UE declared interference on. In this case, the target cell would require less HARQ retransmissions and provide a better service. Another potential use would be if the operator has only one frequency, when excluding a cell would be the only option available after a radio link failure. Furthermore, the mobile telephone could consider how long ago the interference indicating signal was sent. If it was sent more than a predetermined period of time ago, the period being timed by a timer, which may be the timer 77, or a different timer, then its sending may be disregarded, whereas if it was sent within that period then this information may be used to exclude the cell and/or frequency from consideration.

When a UE in a call needs to be handed over to another cell or RAT, or if a call drops out so that the connection with a cell needs to be re-established (Radio Resource Control (RRC) re-establishment), the handover or RRC re-establishment may be triggered while the timer 77 is running If this occurs, and the new target cell (for handover or RRC re-establishment) is on another frequency, then the timer is stopped and the criteria for interference re-evaluated based on the new target cell (frequency), as the interference conditions may well, of course, be different for the new frequency. If it is found that there is still a high level of interference, then the interference indicating signal is sent, and the timer reset. If the trigger for handover or RRC re-establishment occurs while the timer is running but the target cell is on the same frequency, then either the timer is stopped and the criteria for interference re-evaluated (as for the case of a different frequency), or the timer can be kept running and the indication signal is sent when the timer expires based on the level of interference based on the signal from the target cell. Thus, when the RRC re-establishment procedure is initiated the cell selection process is performed such that, if an interference indicating signal (reactive trigger) has been sent and the timer has not yet expired the frequency included in the interference indicating signal (reactive trigger) is excluded from the cell selection process. The timer is optionally reset when the interference indicating signal (reactive trigger) is sent to the cell (base station).

Modifications and Alternatives

A detailed embodiment has been described above. As those skilled in the art will appreciate, a number of modifications and alternatives can be made to the above embodiment whilst still benefiting from the inventions embodied therein.

In the above embodiment, a mobile telephone based telecommunications system was described. As those skilled in the art will appreciate, the interference determining, signalling and handover techniques described in the present application can be employed in other communications system. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base stations or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

This application is based upon and claims the benefit of priority from United Kingdom patent application No. 1105693.4, filed on Apr. 4, 2011, the disclosure of which is incorporated herein in its entirety by reference.

The invention claimed is:

1. A mobile communications device comprising:
   a transmitter of a first radio technology on a first frequency band;
   a transceiver of a second radio technology on a second frequency band; and
   interference determining means for determining whether transmission from the transmitter is or potentially may interfere with reception by the transceiver;
   the transceiver being configured for:
     i) transmitting an interference indication signal for a network base station of the second radio technology that there is or may be interference with reception in the second frequency band in the mobile communications device; and
     ii) transmitting, subsequent to transmitting the interference indication signal, a lack of interference indication signal for the network base station of the second radio technology that there is or may be no interference with reception in the second frequency band in the mobile communications device;
   wherein said interference indication signal and said lack of interference indication signal are each transmitted responsive to a respective detected change in interference level such that once interference has been detected and an interference indication signal has been transmitted for said network base station, no further interference indication signal is transmitted until after a lack of interference signal has been transmitted.

2. The mobile communications device according to claim 1, wherein said interference determining means determines whether there is or is not interference based on whether a measured interference level is above or below a predetermined threshold.

3. The mobile communications device according to claim 1, wherein said interference determining means determines whether there is or is not interference based on whether proposed transmission by the transmitter is likely to interfere with reception by the transceiver.

4. The mobile communications device according to claim 1, wherein the lack of interference indication signal is transmitted only once.

5. The mobile communications device according to claim 1, further comprising a timer for timing a predetermined time and is set whenever the interference indicating signal is transmitted by the transceiver; and
 a means for excluding a cell and/or frequency excludes a cell and/or frequency from the plurality of possible cells and/or frequencies if the timer has not expired.

6. A communications system comprising:
 the mobile communications device according to claim 1; and
 a base station of the second radio technology in communication with the mobile communications device,
 wherein the base station comprises a receiver for receiving the interference indication signal transmitted by the mobile communication device and an interference mitigation means for changing one or more parameters of the communication with the mobile communications device in order to mitigate the interference.

7. The communications system according to claim 6, wherein the base station includes a timer for timing a predetermined period, and wherein the interference mitigation means reverts the one or more parameters that were changed back to previous parameters when the timer expires.

8. The communications system according to claim 6, wherein the receiver is configured for receiving a lack of interference indication signal transmitted by the mobile communication device, and wherein the interference mitigation means reverts the one or more parameters that were changed back to previous parameters when the receiver receives a lack of interference indication signal.

9. A non-transitory computer readable recording medium comprising computer implementable instructions for causing a programmable computer device to function as the mobile communications device of claim 1.

10. The mobile communications device according to claim 1, wherein the interference determining means comprises an interference determining module configured for determining whether transmission from the transmitter interferes with, or potentially may interfere with, reception by the transceiver by execution of computer implemented instructions stored on a non-transitory computer readable recording medium.

11. A mobile communications device comprising:
 a transmitter of a first radio technology on a first frequency band;
 a transceiver of a second radio technology on a second frequency band; and
 interference determining means for determining whether transmission from the transmitter is or may interfere with reception by the transceiver;
 the transceiver being configured for:
  i) transmitting an interference indication signal for a network base station of the second radio technology if the interference determining means determines that there is or may be interference with reception in the second frequency band in the mobile communications device; and
  ii) transmitting, subsequent to transmitting the interference indication signal, a lack of interference indication signal for the network base station of the second radio technology if the interference determining means determines that there is or may be no interference between transmission from the transmitter and reception on the receiver;
 wherein said interference indication signal and said lack of interference indication signal are each transmitted responsive to a respective detected change in interference level such that once interference has been detected and an interference indication signal has been transmitted for said network base station, no further interference indication signal is transmitted until after a lack of interference signal has been transmitted.

* * * * *